United States Patent

Minor, Jr. et al.

[11] 3,878,594
[45] Apr. 22, 1975

[54] PROCESS FOR MANUFACTURING HUMIDIFIER FILTER MEDIA

[75] Inventors: Walter A. Minor, Jr., El Dorado, Ark.

[73] Assignee: Carrier Corporation, Syracuse, N.Y.

[22] Filed: Oct. 7, 1974

[21] Appl. No.: 512,582

Related U.S. Application Data

[62] Division of Ser. No. 323,187, Jan. 12, 1973.

[52] U.S. Cl. ......... 29/163.5 F; 29/163.5 R; 55/486; 55/487; 55/498; 55/525
[51] Int. Cl. ............................................. B23p 15/16
[58] Field of Search ............... 29/163.5 F, 163.5 R, 163.5 CW; 55/443, 486, 487, 498, 525, 520; 261/99

[56] References Cited
UNITED STATES PATENTS

| | | | |
|---|---|---|---|
| 2,037,164 | 4/1936 | Harrah | 55/525 X |
| 2,341,097 | 2/1944 | Heebink | 29/163.5 F |
| 2,602,521 | 7/1952 | Smith | 55/487 |
| 2,763,906 | 9/1956 | Sterick | 29/163.5 F X |

Primary Examiner—Richard J. Herbst
Assistant Examiner—Victor A. DiPalma
Attorney, Agent, or Firm—J. Raymond Curtin; Donald F. Daley

[57] ABSTRACT

A humidifier and filter media composed of two or more layers of expanded sheet material rolled or folded into a bundle. The different expansion sizes of the sheet material prevents nesting and separation of the layers of the bundle to improve evaporation and filtering characteristics. Two or more rolls of sheet material are slitted, expanded, and forced into surface contact. The combined sheets are then automatically rolled or folded into a bundle of the desired size.

2 Claims, 5 Drawing Figures

PROCESS FOR MANUFACTURING HUMIDIFIER FILTER MEDIA

This is a division of application Ser. No. 323,187 filed Jan. 12, 1973.

BACKGROUND OF THE INVENTION

This invention relates in general to humidifiers and filters and more particularly, to humidifier and filtering media and the method of manufacturing the media element.

In humidifiers and filters a fluid substance, either gaseous or liquid, passes through a porous media for the purpose of removing particulate material from the liquid or gaseous flow in the case of a filter and/or entraining or absorbing moisture in the gaseous material in the case of a humidifier. The porous material is referred to herein as the media or the filter bundle and is conventionally composed of material or layers of material which will allow the passage of the fluid substance while at the same time providing a large amount of surface area to contact the fluid substance without unduly restricting the flow characteristics of the fluid. Various types of porous or fibrous materials have been used for this purpose, however, this invention is concerned with the use of expanded foil or sheet material. Such sheets are normally formed by producing a series of staggered rows of slits in a sheet or foil of metal or other suitable material and laterally expanding the sheet by stretching in a direction transverse to the direction of the slits. The stretching elongates the sheet causing the individual slits to open into a generally diamond shape and forming a lattice or network of generally diamond shaped openings. Expanded sheet material of this type is shown in U.S. Pat. No. 2,989,145, issued June 20, 1961 to A. M. Goodloe.

Fabrication of the filter media formed by layers of material is expensive due to the cutting and stacking of sheets that is required. In addition, there is a tendency for the sheets of filter material to nest or align openings producing intermeshing between various sheets of material and reducing the thickness of the bundle and the effective surface area exposed to the fluid material. When this occurs, the water being used for humidification purposes cannot transfer between the sheets and less wetted surface area is available for evaporation purposes. In addition, the effective filtering path of the fluid material through the media is reduced, producing a resultant decrease in effective filtering of particulate material. It has been found that this type of nesting can be reduced by rotating successive layers of filter material produced of expanded sheet material 90° so that the diamond configuration of the sheet material is alternated 90° between each layer. However, this requires the manual rotation of alternate layers during manufacture and results in increased costs of fabrication of the filter media. It has also been determined that the most economical method of producing the filter media is to roll the filter media into a bundle from a continuous source of filter material. An example of this type of construction utilizing conventional filter materials is shown in U.S. Pat. No. 3,231,092, issued Jan. 25, 1966 to J. H. Goldman. However, this type of filter fabrication results in the nesting and separation of adjacent sheets, as described above.

In humidifiers, the resulting loss of evaporation due to nesting and separation of sheets can be as high as 25–50 percent of the effective capacity of the humidifier. The present invention eliminates the nesting effect and eliminates the loss of evaporation due to the nesting effect, and greatly reduces the fabrication cost over and above the fabrication of cut sheet bundles. In addition, the rolled top of a folded bundle improves the distribution of water within the media bundle and produces better wetting of the media surfaces. Therefor, it is apparent that the most desirable media bundle would be one which could utilize the rolled or folded media concept and eliminate the nesting and separation of sheets.

It is therefore an object of the present invention to improve the wetting and filtering characteristics of media material used in humidifiers and filters;

it is a further object of this invention to reduce the manufacturing costs of media bundles in humidifiers and filters without adversely affecting filtering and water absorption characteristics;

it is a further object of this invention to improve the wetting water absorption characteristics of filter media used in humidifiers;

it is a further object of this invention to prevent nesting of layers of filter material in the filter media of a humidifier;

it is also an object of this invention to manufacture media bundles for humidifiers and filters automatically and inexpensively without affecting the water absorbing or filtering characteristics of the bundle.

These and other objects of this invention are attained by means of a humidifier or filter media bundle composed of expanded sheet material of different expansion sizes with the bundle formed of alternate layers of the differently expanded sheet material. The bundle is formed by providing a continuous source of each of the differently expanded sheet materials and bringing the sheets of material to adjacent or contiguous relationship and rolling or folding the layers into a bundle whereby the alternate layers of the bundle will be composed of differently expanded material.

BRIEF DESCRIPTION OF THE DRAWINGS

The invention will be hereinafter more fully described with reference to the accompanying drawings in which.

DESCRIPTION OF THE PREFERRED EMBODIMENT

Figure 1:
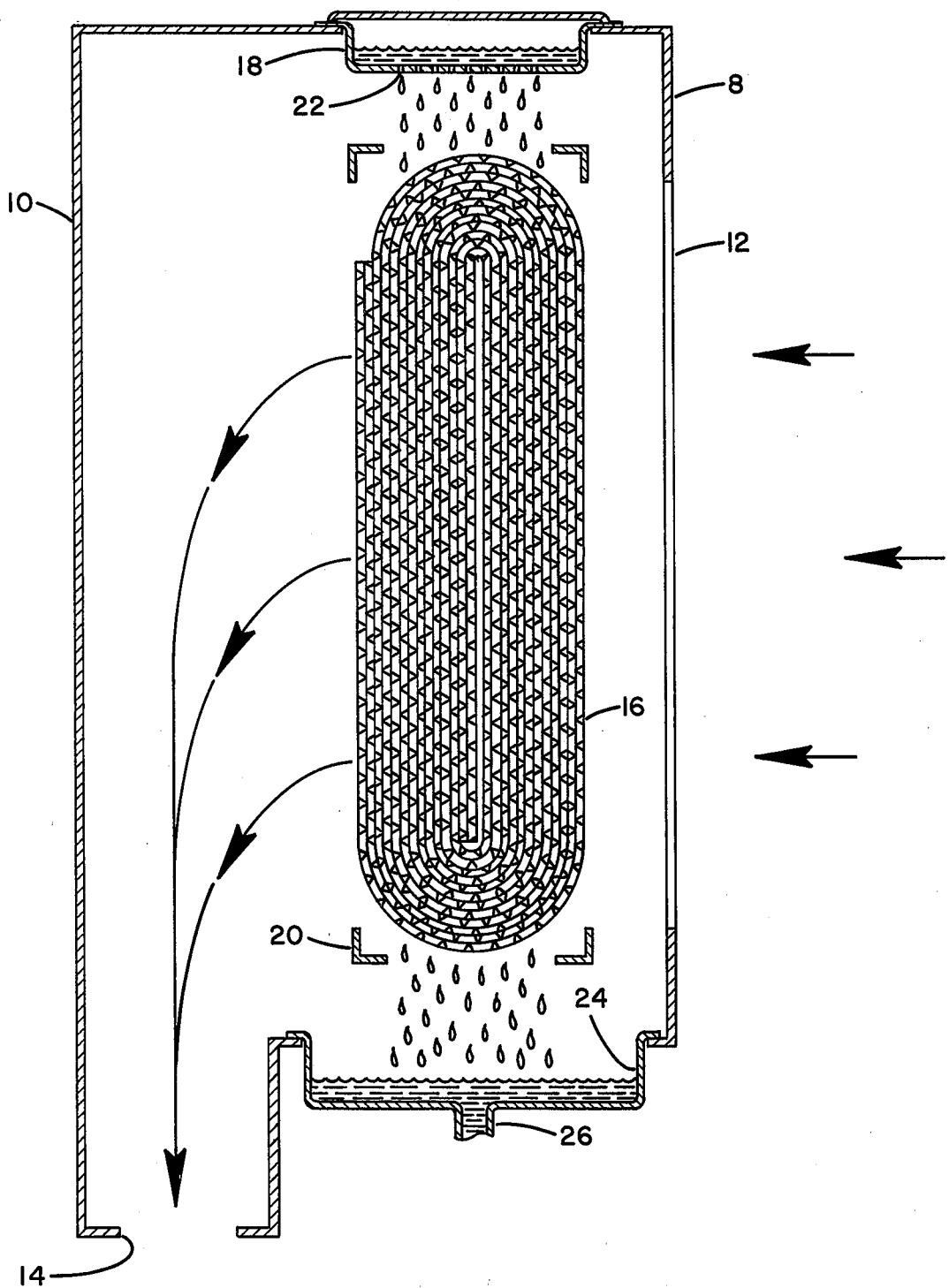
FIG. 1 is a sectional view of a humidifier showing cross-section of the filter media.
Figure 2:
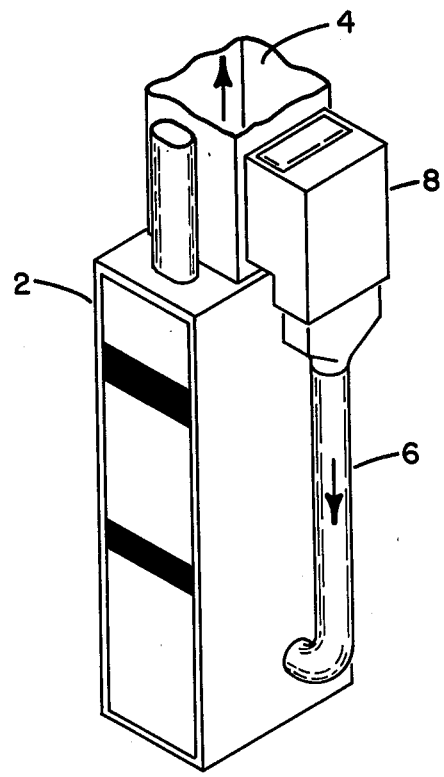
FIG. 2 is an isometric view of a furnace and heating system incorporating a humidifier of the type shown in FIG. 1.

Referring to FIG. 2, there is shown a conventional heating furnace 2 having a hot air duct 4 and a warm air bypass duct 6. Humidifiers are conventionally placed in the warm air duct of a furnace and may be of the type which has an evaporative surface or media which extends into a liquid reservoir which is either rotated or, through capillary action, carries water from the reservoir into the path of flow of the warm air leaving the furnace. The type of humidifier shown in the preferred embodiment herein, is of the type whereby a portion of the warm air leaving the furnace is bypassed around the furnace and passed through a filter media which has a large evaporative surface and means to supply water to the evaporative surface and is then returned to the cold air side of the heating system. The cold air side of the furnace has a negative pressure compared to warm air supply ducts so that bypassed air flow from the warm air supply to the cold air return. A humidifier of this type is shown at 8 in FIG. 2, in the warm air bypass 6. FIG. 1 shows a cross-sectional view of the humidifier 8 with an outer casing 10, an air inlet opening 12 and an air outlet opening 14. The general air flow is indicated by the arrows through the air inlet 12 through a filter media bundle 16 and out the air outlet opening 14. A water reservoir 18 is mounted in the casing 10 above the filter media bundle 16. Water is supplied to the reservoir 18 from an external source and is controlled by an automatic valve, not shown. The media bundle 16 is mounted in the casing 10 by means of a frame or bracket 20 directly beneath the reservoir 18. The frame 20 is separable from the humidifier and is used to contain the media bundle during shipping and installation. The bottom of the reservoir 18 has a series of openings 22 which may be of any type which will allow a regulated flow of water droplets onto the top of the media bundle 16. Water dripping from the reservoir 18 through the holes 22 lands on the top of the media bundle 16 and wets the surface of the media bundle. The contacts between the various layers of the media bundle allows the water to wet all the surface in the bundle and move downwardly through the bundle. Water which has not been evaporated from the media bundle by the air flowing through the bundle works its way to the bottom of the bundle and drips into an accumulator reservoir 24 from which it is drained through discharge piping 26.

Figure 4:
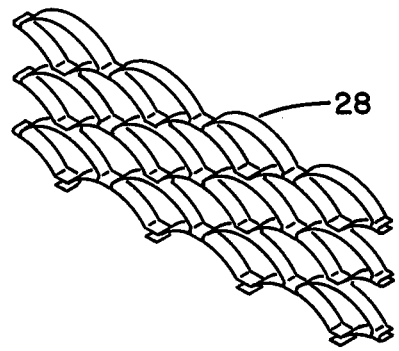
FIG. 4 is a top view of a section of expanded sheet material of the type used in the present invention.

A portion of the expanded sheet material used to make up the filter media bundle 16 is shown in FIG. 4. The material is manufactured by taking thin sheet material or foil of aluminum or other metal material or any material which is capable of being formed and holding a set after deformation. Aluminum is such a material and is suitable for use in a humidifier installation since it is capable of being formed into thin sheets of foil, can be expanded to hold a set, and is non-corrosive when subjected to the wetting action of the water in the humidifier. Rows of short independent slits are made in the sheet material with adjacent rows of slits staggered so that slitted portions in each row is adjacent to non-slitted portions in each adjacent row. The sheet material is then stretched or expanded in a direction transverse to the rows of slits. The expansion of the sheet material causes the slits to open forming alternating rows of substantially diamond shaped openings 28 of the type shown in FIG. 4. The sheet material between the open diamonds tends to rotate, producing surface areas facing in a direction generally perpendicular to the plane of the original sheet material. The size of the diamond openings formed depends upon the amount of expansion or stretching of the original slitted sheet material. This invention contemplates that the alternate layers of material in the final media bundle be expanded to produce different size diamonds. For example, one sheet of material could be expanded to provide the size diamond desired and a second sheet of material expanded to half the distance of the first sheet material.

The ratio of 1 to ½ is not significant. It is merely required that the two diamonds have differences in size sufficient to prevent nesting of the material. It has been found that expansion of one sheet of material to produce a diamond from 0.70 inch to 0.73 inch in width and 0.39 inch to 0.41 inch in height from a foil material having a thickness of approximately 0.003 inch and expanding a second sheet of material having a thickness of approximately 0.003 inch to form a diamond having a width of 0.58 inch to 0.60 inch and a diamond height of 0.50 inch to 0.70 inch will produce two sheets with a lattice network with suitable surface exposure and sufficient rigidity to prevent the nesting or compaction of the material when formed into a bundle.

Though two sheets of material with different sizes are shown herein as examples, the invention contemplates using any number of sheets of material as long as adjacent sheets in the final bundle have different size diamonod lattices. As examples, it would be possible to use three different sheet sources with each sheet source expanded to a different size lattice network. The three sheets would then be brought into surface contact and rolled into a final bundle. Additionally, it is within the scope of this invention to bring groups of sheets of differently expanded material into contact to form a bundle. In this case, the groups could have sheets differently expanded within the group but each group could be the same as other groups or different from other groups.

Figure 5:
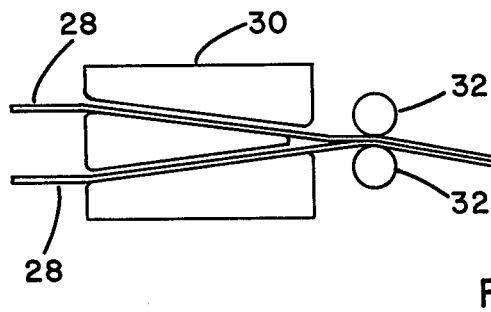
FIG. 5 is a schematic view of the method of folding or rolling the filter media shown in FIG. 3.
Figure 5:
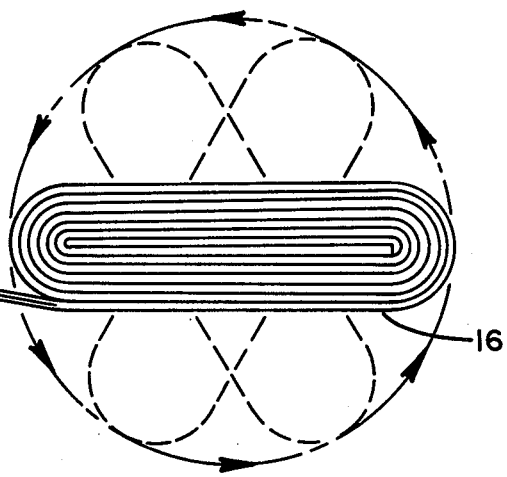
Figure 3:
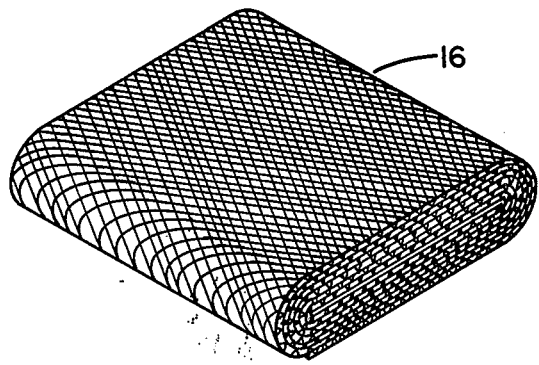
FIG. 3 is an isometric view of a rolled filter media bundle.

In manufacture, the sheets of material are expanded continuously by known methods and fed through a guide 30 to a pair of rollers 32, shown in FIG. 5. Though two sources of sheet material are shown, any number of sources could be used. The continuous sheets of the two expanded materials are forced into surface contact by the rollers. The combined strip of material is then rolled or folded to the size desired or necessary for use in the particular humidifier or filter apparatus. When the bundle has reached the thickness desired, the sheet material is cut forming a separate bundle of media material, as shown in isometric form in FIG. 3. The media bundle can then be placed in frame 20 and then in the humidifier 8.

Having thus described the invention relative to the preferred embodiment disclosed, it is understood that various changes may be made by one skilled in the art without departing from the spirit and scope of the invention.

I claim:

1. The method of forming a humidifier media bundle comprising:
   placing sheets of expanded sheet material each of which has been expanded to produce different size openings in the sheet, into face-to-face surface contact; and
   folding the sheets of expanded sheet material into a bundle composed of continuous sheets of material with alternate layers of the bundle formed of expanded sheet material having different size openings.

2. The method of forming a humidifier media bundle comprising:
   the steps of slitting a first continuous sheet of material to form laterally spaced rows of slits so arranged that slits in alternate rows are disposed in staggered relation, stretching the sheet material a given amount in a direction transverse to the rows of slits to thereby open the slits to form a lattice of openings in the sheet material;

slitting a second continuous sheet to form laterally spaced rows of slits so arranged that slits of alternate rows are disposed in staggered relation, stretching the sheet material a different amount from the first sheet material in a direction transverse to the rows of slits to thereby form a lattice of openings in the second sheet;

feeding the first and second sheets of slitted and stretched material into face-to-face surface contact; and rolling the two sheets into a bundle with alternate layers composed of sheet material with different size lattice of openings.

\* \* \* \* \*